Feb. 23, 1960   A. KENNAWAY ET AL   2,926,010
AUTOMATIC WEIGHER

Filed Feb. 13, 1953   8 Sheets-Sheet 1

INVENTORS
ALEXANDER KENNAWAY
OWEN RUPERT PIGOTT

BY Cushman, Darby & Cushman
ATTORNEYS

Feb. 23, 1960

A. KENNAWAY ET AL

2,926,010

AUTOMATIC WEIGHER

Filed Feb. 13, 1953

INVENTORS
ALEXANDER KENNAWAY
OWEN RUPERT PIGOTT

ATTORNEYS

Feb. 23, 1960  A. KENNAWAY ET AL  2,926,010
AUTOMATIC WEIGHER
Filed Feb. 13, 1953
8 Sheets-Sheet 4

INVENTORS
ALEXANDER KENNAWAY
OWEN RUPERT PIGOTT
BY Cushman, Darby & Cushman
ATTORNEYS

A. KENNAWAY ET AL 2,926,010

AUTOMATIC WEIGHER

Filed Feb. 13, 1953

INVENTORS
ALEXANDER KENNAWAY
OWEN RUPERT PIGOTT
BY

ATTORNEYS

INVENTORS
ALEXANDER KENNAWAY
OWEN RUPERT PIGOTT
BY Cushman, Darby & Cushman
ATTORNEYS ID # United States Patent Office 2,926,010
Patented Feb. 23, 1960

2,926,010

AUTOMATIC WEIGHER

Alexander Kennaway, London, and Owen Rupert Pigott, Tewin Wood, England, assignors to Imperial Chemical Industries Limited, London, England, a corporation of Great Britain Application February 13, 1953, Serial No. 336,847

Claims priority, application Great Britain February 18, 1952

18 Claims. (Cl. 265—27)

This invention relates to weighing equipment designed for use where material is weighed directly into a container.

In weighing operations an article carrying unit, e.g. a hook, pan or platform (hereinafter referred to as a platform for convenience) is depressed against a counteracting force, and the movement of this unit causes a determinate movement in, for example, a shaft. This movement actuates a weight determining means which may be a pointer and scale, the movement of the former relative to the latter indicating the weight on the platform, or a counter which indicates the weight on the platform, or when a particular weight is involved as when an automatic feeder is used, a movement from one point to another, e.g. the movement of the end of a pointer from its zero position to a prearranged point in its circular path.

It is often convenient to weigh material directly into containers. This procedure involves placing the container on the weighing machine, weighing it or making an allowance for the weight of the container, and thereafter filling the container adequately and measuring the final weight, or introducing the material into the container until the desired weight is reached. The weight of the container is called the tare weight, and the procedure of allowing for the weight of the container is known as taring.

When a large amount of material is to be weighed out into a large number of containers so that each holds an equal weight of the material, it is found that since the weights of the containers vary slightly, each container must be tared separately. The process of taring has hitherto been carried out in a variety of ways, for example, the container may be weighed empty and then again after the material which it is to contain has been added. This is a slow method and the process of taring has been speeded up by the use of weighing machines in which the container is first placed on the weighing machine and the pointer is returned to zero by a hand adjusted mechanism, i.e. by adjusting the weight determining means, and the material is thereafter weighed into the container until the pointer registers the desired weight. The filled container is removed, the machine is adjusted to give a true zero and a new container is then placed on the machine for the next weighing operation. In such a weighing machine, it follows that the accuracy of the final weighing depends upon the accuracy with which the operator adjusts the zero of his machine at each weighing. The inaccuracies which are introduced by this re-adjustment may be tolerated when the material being weighed out is relatively cheap, but when the material being weighed out is relatively expensive, or if many repetitive weighings are involved, then a method of taring which is independent of the ability of the operator to re-adjust the machine is desirable.

According to the present invention we provide weighing mechanism, for measuring the net weight, and if desired the tare and gross weights, of material in containers, in which a mechanism for adjusting a weight measuring means to zero may be actuated by movement of an article carrying unit of a weighing machine when a container is carried by it, and in which when equilibrium has been reached in the weighing equipment between the weight of said container, the movement of said unit and the movement of said mechanism, a detecting means detects this equilibrium and thereupon prevents further adjustment of the weight measuring means by said mechanism. Alternatively, according to our invention weighing mechanism is provided whereby a weight measuring means may be held in a non-operating condition until equilibrium has been reached in the weighing equipment, and a detecting means detects this equilibrium and initially activates the weight measuring means. This alternative method of operating our invention is suited for measuring net weights of material weighed directly into containers, in which case the equilibrium referred to is that between the weight of a container carried by an article carrying unit and the weighing equipment, or for measuring gross weights without the necessity of a zero adjustment to the weight measuring means, in which case the equilibrium referred to is the equilibrium in the weighing equipment before the article to be weighed is placed on the article carrying unit, which, however, may carry other articles or materials.

Said detecting means may also (1) effect a recording of said adjustment, i.e. the tare weight, and/or (2) start a flow of material into the container.

Throughout this specification:

(a) When this invention is concerned with net weights the word "measuring" includes both measuring the weight of material that has been fed into a container while it is carried by a weighing machine platform, and measuring out a desired weight of material by an automatic feeding mechanism. Thus our invention provides improvements in measuring the weight of material in containers and in measuring out material into containers.

(b) The word "material" includes articles as well as materials such as powders, granules, pellets, lumps, chippings, slurries, pastes, liquids, and gases.

Our invention will now be described by reference to the attached drawings which illustrate in diagrammatic form various embodiments of our equipment.

Referring to the drawings.

Figure 1:
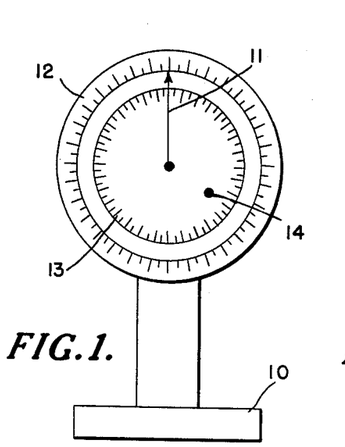
Figure 1 is a front elevational view of one embodiment of the weighing equipment.

Figure 1 illustrates a front elevation of a weighing machine having a platform 10, a pointer 11, a fixed scale 12 and a movable scale 13. The pointer 11 moves in a determinate manner according to any depression of the platform 10. It thus indicates tare and gross weights against the scale 12. The scale 13 is moved by a suitable mechanism, such as the mechanisms illustrated in Figures 3 and 4, and described hereinafter, or a magnetic clutch, and ceases to move when equilibrium has been reached between the weight of the article placed on the platform, the depression of the platform and movement of such mechanism. Methods for detecting equilibrium are described hereinafter and are illustrated in Figures 5, 6, 11, 13, 14, 15, 16 and 17, and these methods or variations of them may be used to stop further operation of the mechanism, clutch or otherwise, which has moved the scale 13, e.g. by causing an electric relay to drop out thus opening a circuit which has controlled the mechanism, clutched or otherwise. Thus, pointer 11 indicates on scale 13 the net weight of any material fed into a container placed on the platform. Alternatively, operation of the weighing equipment may be started by placing, e.g. a container, on the platform and controlled by a time switch which only allows further actions when equilibrium must have been reached between the weight of the container and the equipment. It then, as well as allowing further weighing operations, stops the further operation of the mechanism, clutch or otherwise, which has moved. When a filled container is removed from the platform and pointer 11 returns to zero, an electric circuit is brought into action for actuating the mechanism which moves scale 13, as for example, as shown in Figure 6 and scale 13 is thereby returned to the zero position of scale 12. Where there is any possibility in returning the scale 13 by means of a servomotor system of the follower being more than 180° out of alignment with the transmitter, it is preferred that the follower should be spring returned if it is important that the disc should return to zero in the opposite direction from which it leaves the zero. A wiping contact is shown at 14 for use in automatically measuring materials as referred to hereinafter under the heading "wiping contacts."

Figure 2:
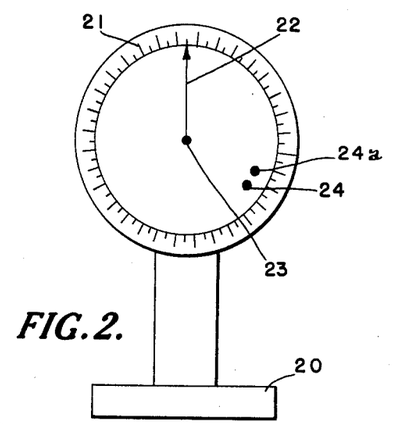
Figure 2 is a front elevational view of another embodiment of the weighing equipment.

Figure 2 illustrates a weighing machine having a platform 20, a calibrated scale 21 and pointer 22 and a revolving shaft 23 which is actuated to a determinate degree by depression of the platform 20. When a container is placed on platform 20, shaft 23 is allowed to slip in relation to the pointer 22 until equilibrium is reached between the weight of the container and the weighing equipment, when a magnetic clutch is operated to cause the pointer 22 to follow any further movement of the shaft 23. Instead of a magnetic clutch, an indirect driving system such as is described hereinafter and illustrated in Figures 3 and 4, may be used. Preferably movement of the platform causes either the flow of electricity in a transmitter/follower servomotor system or in a Wheatstone bridge system, or the flow of fluid in a pneumatic or hydraulic system, and when this flow of electricity or fluid stops, an electric relay operates to actuate a magnetic clutch or indirect driving circuit causing pointer 22 to follow the further movement of shaft 23. Alternatively a time switch mechanism as previously referred to, may be used. When material is placed in the container movement of the pointer indicates the weight of the material, i.e. its net weight in the container. If it is desired to indicate the tare and gross weights of the container a second pointer can be provided which is permanently attached to shaft 23, and if it is desired that the tare weight should be directly available at the completion of the weighing, a second scale can be carried by either pointer but which moves below both of them, the tare weight then being shown by the difference between this scale and the other pointer. When the filled container is removed from platform 20 the circuit to the magnetic clutch is broken when pointer 22 has returned near to the zero mark. Precise zeroing of the pointer can be effected by springs. When this embodiment is used in combination with an automatic feeder the contacts 24 and 24a are provided. The contacts form part of the feeding mechanism circuit and are so arranged that when pointer 22 wipes 24a the coarse feed changes to a fine feed, and when pointer 22 wipes 24, the feed ceases.

Figures 3, 4:
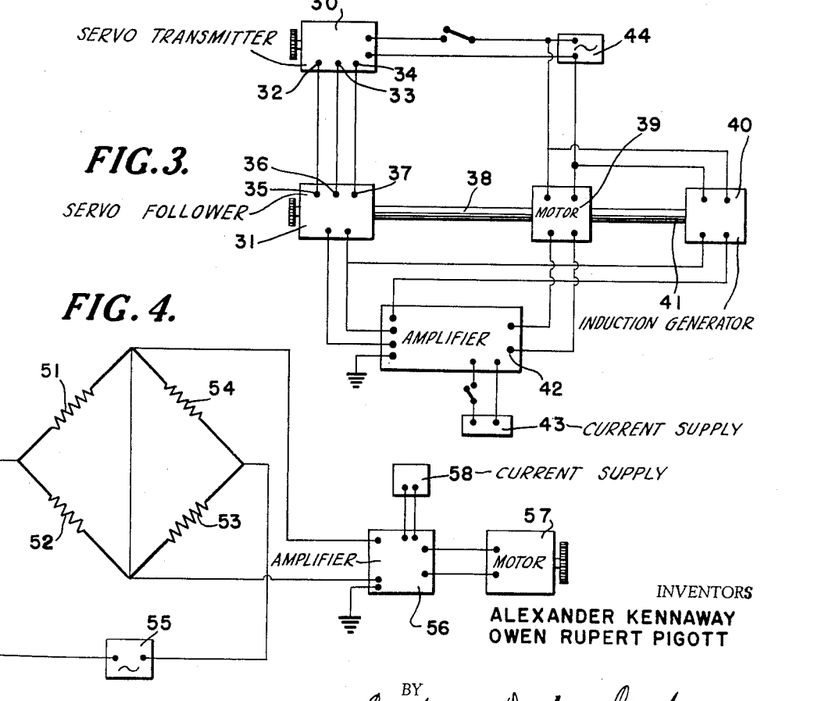
Figure 3 is a circuit diagram illustrating means for adjusting or driving weight determining mechanism.
Figure 4 is a circuit diagram illustrating a Wheatstone bridge system for adjusting or driving weight determining mechanism.

Figure 3 illustrates a servomotor system which may be used to adjust or to drive the weight measuring means. The three phase servomotors are shown at 30 and 31, 30 being the transmitter and 31 the follower, the stator windings being connected across the terminals 32, 33, 34, 35, 36 and 37 as shown. The rotor winding of the servomotor 30 is connected to the source of alternating current 44. The rotor of servomotor 31 is connected directly by means of the shaft 38 to the rotor of the driving motor 39 which is in turn connected directly to the rotor of the induction generator 40 by means of the shaft 41. The rotor winding of the servo motor 31 is connected to the input side of the amplifier 42 and so also is that of the induction generator. The output side of the amplifier is connected to the driving motor. The amplifier is connected to the source of current shown at 43. When the circuits are closed and the rotors of the transmitter and the follower are coincident and the system is at rest, no current flows into the amplifier; when the rotors are not coincident or at rest, current flows into the amplifier and the amplified current flows into the driving motor which then operates to cause the rotor of the follower to move into coincidence with the rotor of the transmitter. The purpose of the induction generator is to have a damping effect upon the movement of the rotor of the follower by providing a damping current to the amplifier.

Figure 4 illustrates a Wheatstone bridge system which may be used to adjust or drive the weight measuring mechanism. The Wheatstone bridge comprises the four resistances 51, 52, 53 and 54 and current is fed into the circuit from the source of alternating current 55. The Wheatstone bridge is connected to the input side of the amplifier 56 as shown, and an electric driving motor 57 is connected to output side of the amplifier. The amplifier is connected to a source of current shown at 58. The resistances 51 and 52 are both variable and 52 is mechanically connected to the rotor of the driving motor so that when resistance 51 is altered, current flows through the circuit which is amplified and fed into the motor. The motor then operates to alter the value of 52 until balance is restored and current ceases to flow through the circuit. Use of this method may be made in the weighing machine illustrated in Figure 1 by making the pointer 11 move over and in contact with a resistance wire, the resistance 51 of Figure 4 being equivalent to the length of resistance wire between the pointer and the fixed zero of the scale. The moving scale in Figure 1 is also made to move over and in contact with a resistance wire, the resistance 52 of Figure 4 being equivalent to the length of resistance wire between the point of contact between the moving scale and the resistance wire, and the zero of the fixed scale. The driving motor is connected to the movable scale. Any displacement of the pointer causes current to flow in the circuit which in turn causes the motor to turn the movable scale until balance is restored, that is, when the zero of the movable scale is opposite the pointer. The movable scale may thus be made to follow any movement of the pointer. The mechanism may be made frictionless by the use of a capacity bridge.

Figure 5:
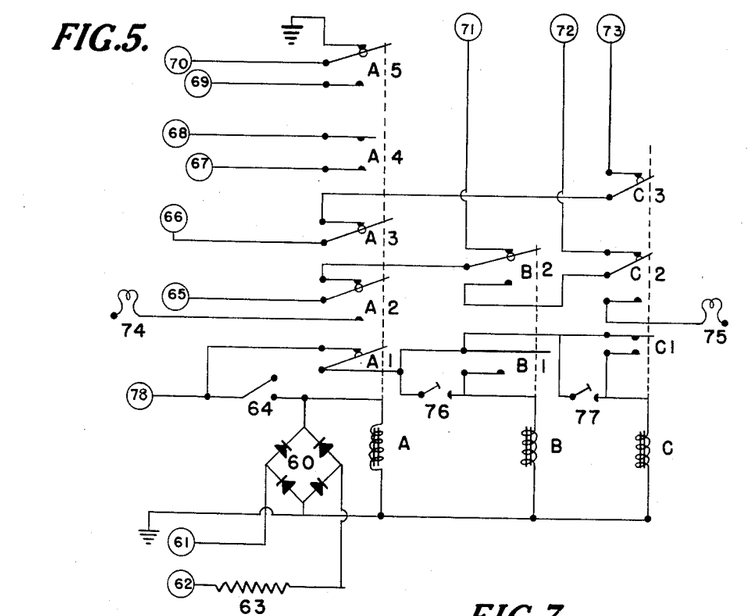
Figure 5 is a circuit diagram of means adapted for use with the embodiment of Figure 2.
Figure 6:
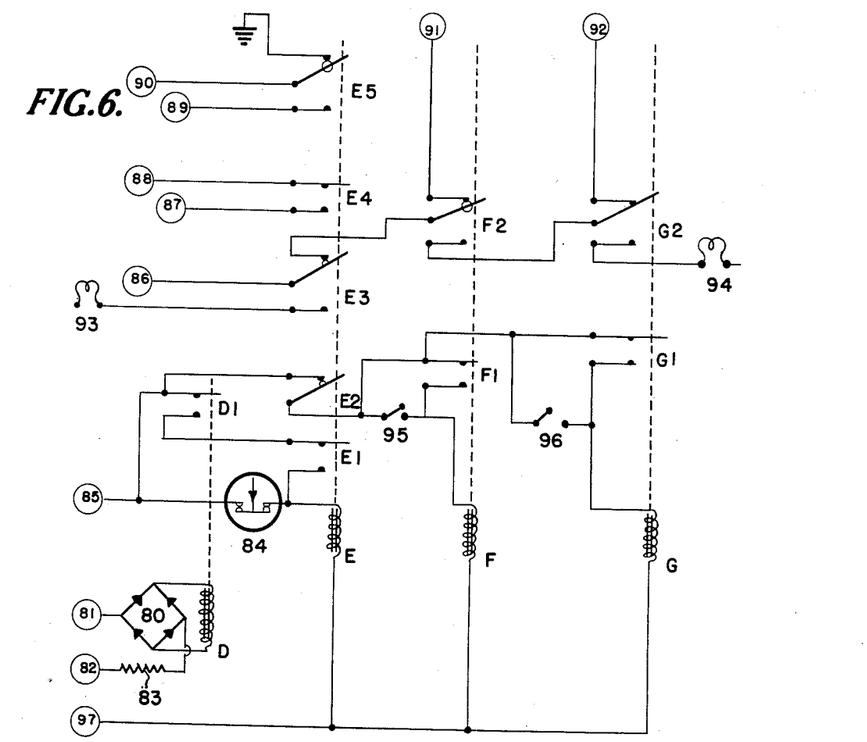
Figure 6 is a circuit diagram of means adapted for use with the embodiment of Figure 1.

Figure 5 illustrates an electrical circuit which may be used to detect equilibrium and to bring a weight measuring means into operation. This electrical circuit can be used in a weighing machine such as that illustrated in Figure 2, in which a pointer is caused to follow the movement of a rotating shaft by means of a magnetic clutch after the container has been tared. A transmitter/follower servomotor system having the transmitter geared to the weighing machine shaft is used to provide an electrical circuit in which equilibrium may be detected.

In Figure 5, 60 is a rectifier connected to the output terminals 61 and 62 of an amplifier whose input terminals are connected to the rotor winding of the follower of the servomotor system. A resistance 63 is included in the line to 62. A platform switch 64 is included which operates a passing contact when a container is placed on the platform; it does not operate when the filled container is removed from the platform. This switch may be mechanically or photoelectrically operated. A, B and C are relays shown in the de-energised condition, which operate the three groups of contacts A1, A2, A3, A4, A5; B1, B2; and C1, C2, C3 respectively. The terminal 65 is connected to a 230 volt supply of alternating current. The terminals 66 and 73 are each connected to the magnetic clutch circuit so that the circuit is closed when contacts A3 and C3 are closed. Terminals 67 and 68 are connected in series through a 50 volt supply of alternating current to the input of the servomotor system, terminal 69 is connected to the servomotor output and terminal 70 is connected to the amplifier input so that the input circuit to the amplifier may be opened or closed by the two way contact A5. Terminals 71 and 72 are connected to an automatic feeding device which can be made to operate by electrical means, the connection through 71 operating a coarse feed and the connection through 72 operating a fine feed. The lamps shown at 74 and 75 are white and green indicating lamps respectively. Other indicating lamps, not shown, are connected in parallel to the automatic feed circuits, a red light for the coarse feed and an amber light for the fine feed. The trips shown at 76 and 77 represent contacts set at pre-determined places on the scale of the weighing machine, which when brushed by the pointer cause, first, the coarse feed to change to a fine feed, and then the feed to stop. The terminal 78 is connected to a 24 volt supply of direct current. The sequence of events which take place during a weighing cycle are set out in Table I. It will be appreciated that when the power supply is first connected to the weighing machine, relay A should be energised by closing contact 64 before the 230 volt circuit is closed, otherwise automatic feeding will start. During a series of weighing operations the relays B and C are always energised when relay A is not energised, except when the weighing machine is in equilibrium at the tare position, and the automatic feed can only therefore, come into operation after the container has been automatically tared. Stage 1 of Table I therefore represents the condition of the weighing machine when a filled container has been removed.

TABLE I

*Sequence of operations of weighing mechanism illustrated in Figures 2 and 5*

| State of weighing operation | State of weighing machine | Magnetic Clutch | State of Servomotor System | Platform Switch | Relay A | Relay B | Relay C | Result |
|---|---|---|---|---|---|---|---|---|
| 1 | Platform empty | Out | In coincidence circuit open. | Open | Out | In | In | Pointer at zero. Green light on. |
| 2 | Drum partly on | Out | Out of coincidence circuit closed. | Closed | In | Out | Out | Pointer remains at zero. White light on. |
| 3 | Drum fully on | Out | do | Open | In | Out | Out | No change. |
| 4 | Drum fully on, equilibrium reached. | In | In coincidence circuit open. | Open | Out | Out | Out | Coarse feed starts. Red light on. Pointer moves. |
| 5 | Trip for coarse feed reached. | In | Circuit open | Open | Out | In | Out | Coarse feed changes to fine feed. Amber light on. |
| 6 | Trip for fine feed reached. | Out | do | Open | Out | In | In | Feed ceases. Green light on. |
| 7 | Drum removed | Out | do | Open | Out | In | In | Pointer returns to zero by spring. Green light on. |
| 8 | Ready for next weighing. | Out | do | Open | Out | In | In | Needle at zero. Green light on. |

The circuit illustrated in Figure 5 may be modified to allow the weighing machine illustrated in Figure 2 to be used for gross weighing only. In this modification the platform switch (this can if desired be instead a pointer operated photoelectric switch) is caused to operate momentarily to switch out the magnetic clutch when the pointer returns to near the zero mark. The pointer is accurately zeroed by springs against a fixed stop. The magnetic clutch is then brought into action again when the unloaded weighing machine is in equilibrium. That is to say, the magnetic clutch operates throughout the weighing cycle until the pointer is near zero, and is brought into action again when the pointer is held accurately at zero by a light spring. Thus whatever the position of the weighing platform in the unloaded position, the pointer will always start from a true zero. This may be achieved by providing the weighing machine with a servomotor system and a circuit which causes the magnetic clutch to be switched in when the servomotor system is in static equilibrium and a hold-on circuit which keeps the magnetic clutch switched in until the hold-on circuit is broken by operation of the switch as the pointer returns. During the interval between the operation of the switch, and the switching in again of the magnetic clutch when the servomotor system is in static coincidence, i.e. when the unloaded weighing machine is in equilibrium, the pointer is spring returned to zero.

Figure 6 illustrates another electrical circuit which may be used to detect equilibrium and to bring a weight measuring means into operation. This circuit can be used in a weighing machine such as that illustrated in Figure 1. The weighing machine comprises a movable scale which is driven by a servomotor system as illustrated in Figure 3, so that the scale moves to follow the movement of the pointer during taring, so that at equilibrium the pointer is opposite the zero of the movable scale, and then ceases to move, the net weight of added material being shown by the movement of the pointer over the movable scale. The circuit is so arranged that when the container has been tared a hydraulic vibratory feeding device feeds material into the container until the pointer brushes the first of two contacts carried by the movable scale. The feed then changes from coarse to fine until the second contact is brushed when the feed ceases. The position of the second contact determines the net weight added to the container. When the filled drum is removed from the scale, the pointer returns to zero and the servomotor mechanism again operates to cause the movable scale to return to the zero position so that the weighing machine is ready for a further weighing operation.

It will be appreciated that when the power supply is first connected to the weighing machine, relay E should be energised before the 230 volt circuit is closed. Stage 1 of Table II represents the condition of the weighing machine after the removal of a filled container.

TABLE II

*Sequence of operations of weighing mechanism illustrated in Figures 1 and 6*

| Stage of weighing operation | State of weighing machine | State of Servomotor system | Platform Switch | Relay D | Relay E | Relay F | Relay G | Result |
|---|---|---|---|---|---|---|---|---|
| 1 | Platform empty | In coincidence Circuit closed. | Closed | Out | In | Out | Out | Pointer and scale at zero. White light on. |
| 2 | Drum partly on | Out of coincidence | do | In | In | Out | Out | Pointer and scale move. White light on. |
| 3 | Drum fully on | do | Open | In | In | Out | Out | White light on. |
| 4 | Equilibrium at tare | Coincidence | do | Out | Out | Out | Out | Coarse feed starts. Red light on. |
| 5 | Coarse feed trip reached. | Circuit open | do | Out | Out | In | Out | Coarse feed changes to fine. Amber light on. |
| 6 | Fine feed trip reached. | do | do | Out | Out | In | In | Feed ceases. Green light on. |
| 7 | Drum removed | Out of coincidence Circuit closed. | Closed | In | In | Out | Out | Pointer returns to zero and scale follows. White light on. |
| 8 | Platform empty at equilibrium. | In coincidence Circuit closed. | do | Out | In | Out | Out | Pointer and scale at zero. White light on. |

In Figure 6, 80 is a rectifier connected to the output terminals 81 and 82 of the amplifier whose input terminals are connected through 89 and 90 and contact E5 to the rotor winding of the follower of the servomotor system. A resistance 83 is included in the circuit. D, E, F and G are relays which operate the four groups of contacts D1; E1, E2, E3, E4, E5; F1, F2; and G1, G2 respectively. The relays are all shown in the de-energised condition. The switch 84 is a switch which is located on the platform and which is opened by the weight of the container resting upon it. It is so located on the platform that it is only opened when the container is fully on the platform. Terminals 85 and 97 are connected to a 24 volt supply of direct current, terminal 86 is connected to a 230 volt supply of alternating current, the other terminal of the A.C. supply being operatively connected in parallel to the coarse and fine feeding mechanisms (91 and 92) of the automatic feeding device. Terminal 87 is connected in series through a 50 volt supply of alternating current to the input terminal of one servomotor system, and terminal 88 is connected to the other input terminal of the servomotor system. Terminals 91 and 92 are connected to the automatic feed device, the connection through 91 operating a coarse feed, and the connection through 92 operating a fine feed. The lamps shown at 93 and 94 are white and green indicating lamps respectively. Other indicating lamps, not shown, are connected in parallel with the automatic feed, a red lamp for the coarse feed and an amber lamp for the fine feed. The trips shown at 95 and 96 represent the contacts on the movable scale. The sequence of events which take place during a weighing cycle are set out in Table II.

Figure 7:
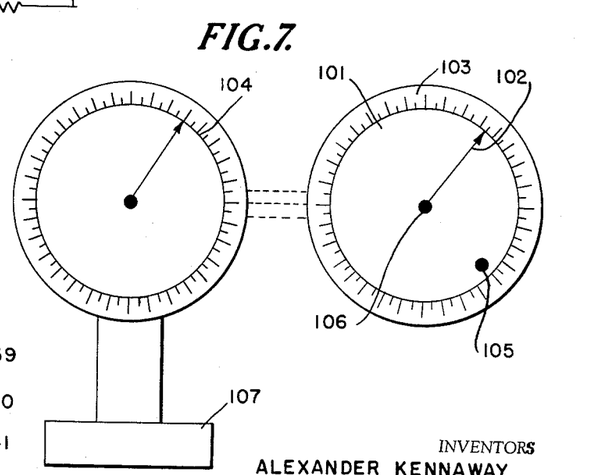
Figures 7 and 8 are elevational and plan views, respectively, of weighing equipment having a remote indicating scale.
Figure 8:
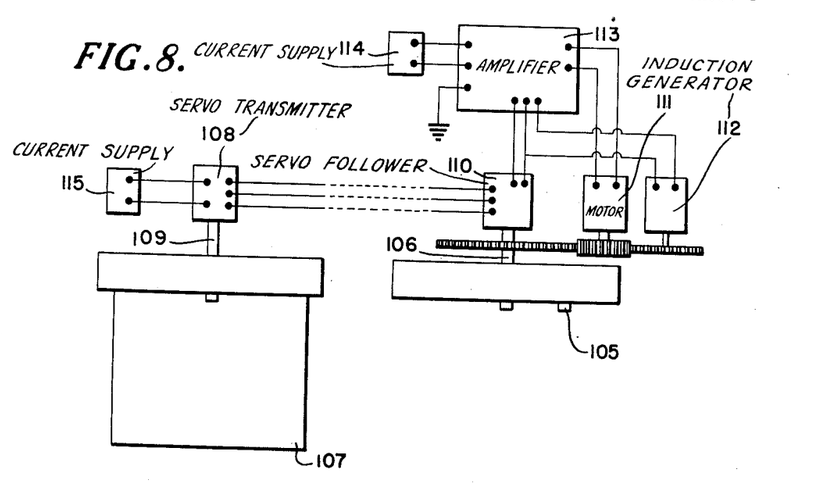

Figures 7 and 8 illustrate in elevation and plan respectively weighing equipment for which there is a weight indicating scale 101 remote from a weighing platform 107. The pointer 102 of the weight indicating scale is actuated by a servomotor system having a transmitter 108 which is driven by a shaft 109, a follower 110, a driving motor 111 and an induction generator 112. There is an amplifier 113 which amplifies current from the servomotor circuit and feeds the amplified current to the driving motor 111. Current is fed to the transmitter 108 from the source 115, and there is a source of current for the amplifier at 114. The scale 101 is movable around the same shaft as pointer 102 and is driven by the follower system of the servomotor when platform 107 is being initially depressed. The scale is driven through a magnetic clutch by the follower system of the servomotor until equilibrium has been reached between the weight of the container on the platform, the depression of the platform and the movement of the servomotor system. Thus, the pointer indicates net weights on the movable scale. The movable scale 103 is provided with a contact 105 for use in combination with an automatic feeder. The electrical circuit operating the feeder is so arranged that when contact 105 is wiped by the pointer the feeder is stopped.

The advantage of a remote indicating scale is that existing weighing equipment can be provided with a mechanism for adjusting the weight determining means with a minimum amount of modification to the existing equipment. Also, remote control allows the minimum amount of mechanical work to be put on the first machine. A further advantage is that the mechanism around the weighing platform is more easily constructed to prevent the intrusion of dust, and the indicating dial can be placed where dust intrusion is not likely to occur to any great degree. A further advantage of a remote indicating unit will be referred to hereinafter. The platform 107 is shown as part of a conventional weighing machine having a scale 104 which will indicate the tare and gross weights.

It is not necessary for the weight indicating means to be in the form of a scale. Thus, the weights may be shown on a panel or may be printed for any suitable record.

Figures 9, 12:
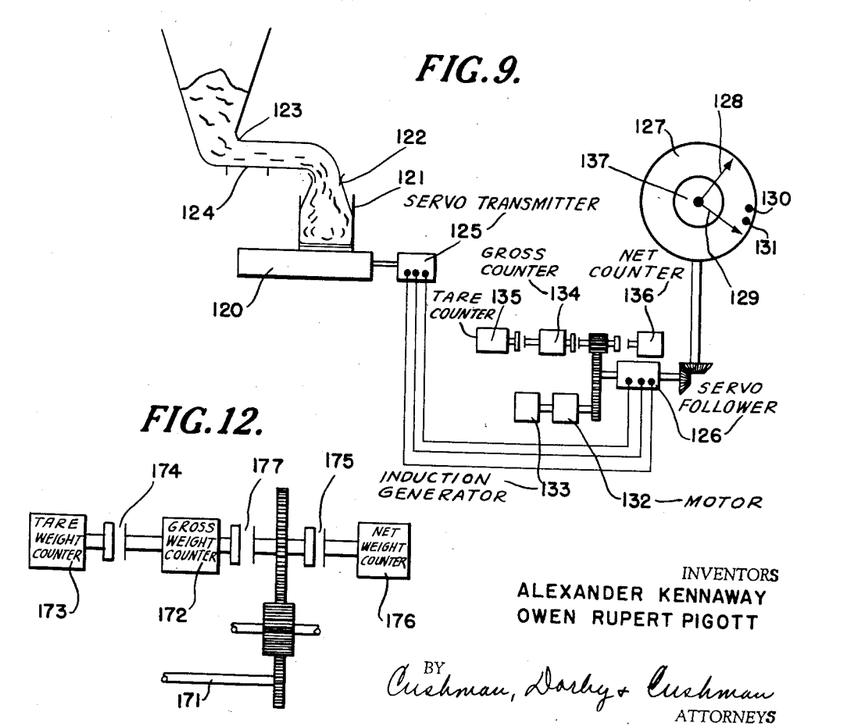
Figure 9 is a diagrammatic illustration of weighing equipment including an automatic feeding device and remote indicating and controlling means.
Figure 12 is a diagrammatic illustration of weight indicating mechanism comprising counters.
Figure 10:
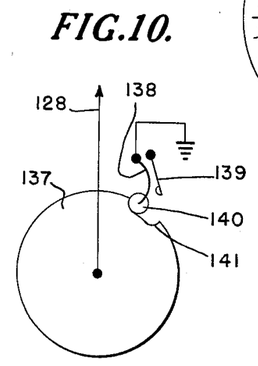
Figure 10 is a diagrammatic illustration of mechanism for returning the weighing machine pointer of Figure 9 to zero.
Figure 11:
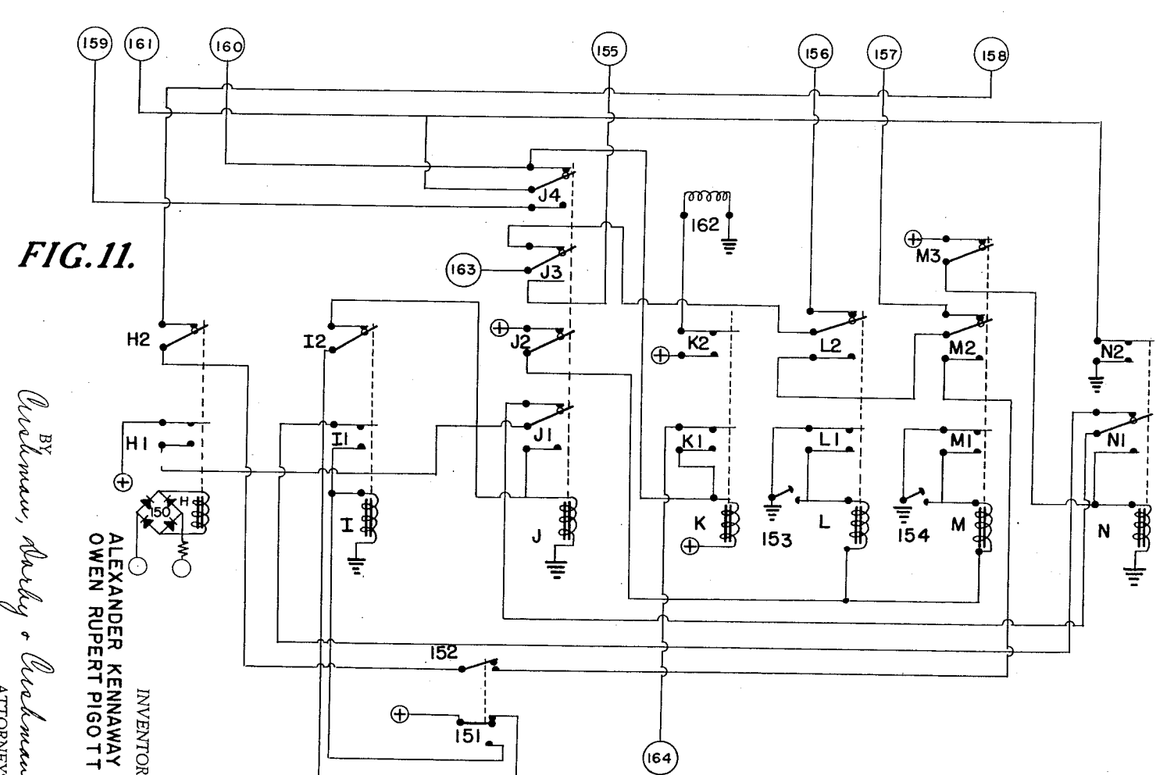
Figure 11 is a circuit diagram of means adapted for use with the weighing equipment of Figure 9.

Figures 9, 10 and 11 illustrate a weighing machine operated automatically by a remote control which gives a visual indication and a printed record of the tare, net and gross weights.

Figure 9 illustrates the general layout of the weighing machine, Figure 10 illustrates the part of the apparatus which sets the net weight indicating pointer to zero, and Figure 11 illustrates the circuit which is used to detect equilibrium in the weighing machine, which controls the action of the automatic feed device and the printing mechanism.

In Figure 9, 120 represents the weighing platform having on it a drum 121 containing a partly filled liner 122, the neck of the liner being attached to the outlet of the automatic feed 123. The purpose of the liner is to keep the material being fed from contact with the inside of the drum where it might be contaminated with particles of paint, or rust or chips of wood (depending on the nature of the container), and sometimes also to prevent the material absorbing moisture from the air. Liners may be made, for example, from strong paper, or from synthetic plastic material, e.g. polyethylene. The automatic feeder has a vibrating table 124 which is operated hydraulically and can be made to give a coarse or fine feed. The movement of the weighing machine platform is communicated to the remote control by a servomotor system, the transmitter being shown at 125 and the follower at 126. The remote control comprises the scale 127 carrying two pointers 128 and 129 and two contacts 130 and 131 which are brushed by pointer 128 when it passes over them, but not by pointer 129. Pointer 128 has attached to it a disc 137 which is made of a light metal, e.g. aluminium, the purpose of this disc is described hereinafter. The disc may if desired be made of a non conducting material, e.g. a synthetic resinous material. Pointer 129 moves continuously during a weighing operation, but pointer 128 is brought into action by a magnetic clutch only after the empty container has been tared. The servomotor system is of the kind hereinbefore described having a driving motor 132 and an induction generator 133. The follower 126 also operates the printer unit, the gross, tare and net counters being shown at 134, 135 and 136 respectively. The printer unit is of the kind described hereinafter and illustrated in Figure 12. The counters are brought into operation by magnetic clutches and a printed record is taken from them at the end of each weighing sequence. The only circuit shown is that connecting the two servomotors, the remainder of the servomotor circuit is similar to that hereinbefore described.

In operation, a container is placed on the weighing platform and the automatic control is brought into operation by operating a manual switch after the drum liner has been arranged to receive the charge. When the switch is closed, the servomotor system is brought into operation and the tare weight is indicated on the tare counter. The gross counter operates continuously during weighing. The pointer 129 also moves to give a visual indication of the tare weight. At equilibrium the coarse feed begins, the tare counter ceases to operate, and the net counter begins to operate. As pointer 128 brushes contact 130 the coarse feed changes to a fine feed and when it brushes contact 131 the feed stops. When all the airborne material delivered by the automatic feeder has reached the container and the system is fully at rest, equilibrium is established and the counters indicate the gross, tare and net weights and the printing mechanism operates to take a printed record. The counters are automatically re-set to zero when the drum is removed from the weighing platform and both pointers return to zero, for example, mechanical counters may be returned to zero by a re-setting arm which effects the re-setting in one movement. The circuit of the magnetic clutch which operates pointer 128 is arranged to open when the pointer is near the zero on its return, e.g. at approximately the one pound mark on the scale, and the pointer is returned to zero by a spring which pushes the pointer back against a fixed stop. The method by which this is achieved is illustrated in Figure 10.

Figure 10 shows a detailed illustration of the method by which the pointer 128 is spring returned to zero. The disc 137 has a notch 141 and a light spring 138 carrying a roller 140 which engages with the notch and tends to push the disc in an anti-clockwise direction. The other end of the spring is fixed to the face of the scale 127 and is grounded. Near the spring is a contact 139, also fixed to the face of scale 127 and which is connected to the magnetic clutch circuit. During net weighing the pointer is engaged by the magnetic clutch and moves in a clockwise direction and the roller 140 rides lightly on the periphery of the disc causing contact to be made between the spring 138 and contact 139. When the filled container is removed from the weighing platform the magnetic clutch remains in operation carrying pointer 128 back towards zero until the roller 140 drops into the notch 141 and breaks the contact with 139. This breaks the magnetic clutch circuit and the pointer is then returned to zero by the action of the spring 138. The position of the notch and the spring are so arranged that the magnetic clutch circuit is opened when the pointer is close to the zero so that only a light spring action is needed to push the pointer back to the fixed stop at zero.

In Figure 11, 150 is a rectifier having its input terminals connected to the output terminals of the amplifier of the servomotor system, and its output terminals connected to the relay H. H, I, J, K, L, M, and N are relays which control the groups of contacts H1, H2; I1, I2; J1, J2, J3, J4; K1, K2; L1, L2; M1, M2, M3; and N1, N2. The relays are shown in the un-energised condition. The two way switch 151 and the single switch 152 are ganged together and are operated by movement of the weighing platform, the contacts being in the position shown when the platform is not loaded or when a container is not fully on the platform, and the moving contacts being in the down position only when a container is fully on the platform. The trips 153 and 154 represent pointer 128 and contact 130, and pointer 128 and contact 131 respectively. When pointer 128 brushes contact 130, trip 153 makes contact and similarly when contact 131 is brushed trip 154 makes contact. Terminal 155 is connected to a white indicator lamp, terminals 156 and 157 are connected to the automatic feed device, terminal 156 controlling the coarse feed, and terminal 157 controlling the fine feed. The coarse feed circuit has in parallel a red indicating lamp and the fine feed circuit has in parallel an amber indicating lamp. Terminal 158 is connected to the printing unit. The printing unit circuit has in parallel a green indicating lamp. Terminals 159, 160 and 161 are connected via the magnetic clutch circuits for the tare, net and gross counters respectively to a 24 volt supply of direct current. The magnetic clutch which operates pointer 128 is shown at 162. Terminal 163 is connected to a 230 volt supply of alternating current. The terminal 164 is connected to contact 139 shown in Figure 10 and provides a hold-on contact for the relay K so that once this relay has been energised and the magnetic clutch circuit closed, the circuit remains closed until the pointer returns nearly to zero and the roller drops into the notch in the disc attached to the pointer. The terminals marked + are each connected to a 24 volt supply of direct current.

Table III sets out the sequence of events which take place during a weighing operation using a machine of the kind illustrated in Figures 9, 10 and 11.

With certain types of materials, e.g. dusty powders, it is sometimes desirable to avoid loss of the material by feeding it into a liner which is supported by a container e.g. a drum, the neck of the liner being tied to the feeding apparatus. The weighing machine illustrated in Figures 9, 10 and 11 is not adapted for the automatic handling of such liners and these must therefore be adjusted manually before weighing is allowed to proceed. To ensure that any force exerted on the weighing machine during this adjustment does not cause incorrectly high tare and gross weights to be indicated on the counters a manual switch may be necessary to switch out the servomotor system during the adjustment of the liner. With mechanical counters this manual switch might not be essential because such counters can be made to rotate backwards as well as forwards with any change in weight. With a counter which operates according to the number of electrical impulses which it receives such a switch is essential because any movement of the pointer will be recorded.

In the weighing machine illustrated in Figures 9, 10 and 11, and where a liner is used, the servomotor circuit is kept open and the ganged switch, in this case manually operated, kept in the up position until the liner is adjusted. The servomotor circuit is then closed, followed by movement of the ganged switch to the down position. The ganged switch may also incorporate a switch which controls the servomotor circuit so that when the ganged switch is down, i.e. 152 is closed, the servomotor circuit is also closed. The switch must however be so arranged that the servomotor circuit closes before switch 151 changes over and before 152 closes. Taring and weighing out then proceed automatically. At the end of weighing the ganged switch is moved up and the servomotor circuit opened when the pointer has returned to zero. Or the circuit may be so arranged that the ganged switch, containing also the servomotor circuit switch, is returned automatically to the up position when the printing operation has been completed.

and any other records which may be required. In this figure, 171 is a shaft actuated by the depression of the weighing machine platform, if desired by means of an electrical or any other servo system acting remotely from the weighing machine platform. This shaft is coupled by suitable gears to a counting mechanism 172, and when an article, e.g. a container, is first placed on the weighing machine platform, the shaft is also coupled to a counting mechanism 173 by means of a magnetic clutch 174. When equilibrium has been reached between the weight of the container and the weighing equipment, magnetic clutch 174 is released and magnetic clutch 175 may be brought into action, coupling shaft 171 to counter 176, by, for example, any of the means hereinbefore described. Thus, when the weighing is completed, counter 172 will show the gross weight of the filled container, counter 173 the tare weight and counter 176 the net weight. These weights may be shown on a panel; alternatively, or additionally, they may be in the form of type against which a form, or a number of forms with carbon papers between them, may be pressed when they are covered with a suitable type ribbon to obtain any records of the weights which may be required. We prefer that where a printed record of weights is to be made that the printing mechanism should not operate or be operable until the weighing operation has been completed and the equipment is at equilibrium. When the filled container is removed from the weighing platform the counters are returned to zero by means normal to counters, and a force which may be used for actuating such means may be an electric current initiated by the return of the weighing platform to its unloaded position, or it may be an immediate

TABLE III

*Sequence of operations of weighing mechanism illustrated in Figures 9, 10 and 11*

| Stage No. | Weighing machine state | Servomotor System | Platform Switch | Magnetic clutch operating pointer | Relays | | | | | | | Result |
|---|---|---|---|---|---|---|---|---|---|---|---|---|
| | | | | | H | I | J | K | L | M | N | |
| 1 | Platform empty | Coincidence at zero | Up | Out | Out | Out | In | Out | Out | Out | In | White light on. No feed. Gross and tare counter circuits closed. |
| 2 | Drum partly on platform. | Out of coincidence | Up | Out | In | Out | In | Out | Out | Out | In | Gross and tare weights being counted. |
| 3 | Drum fully on platform. | do | Down | Out | In | In | In | Out | Out | Out | In | Relay J held only by H1. |
| 4 | Tare weight registered. | Coincidence at tare | Down | In | Out | In | Out | In | Out | Out | In | Coarse feed starts. Magnetic clutch in. Red light on. Net counter in. Tare counter out. |
| 5 | Pointer passes 1 lb. mark. | Out of coincidence | Down | In | In | In | Out | In | Out | Out | In | Roller rides on periphery of disc and makes hold-on contact for relay K. |
| 6 | Coarse feed trip touched. | do | Down | In | In | In | Out | In | In | Out | In | Coarse feed changes to fine. Amber light on. |
| 7 | Fine feed trip touched. | do | Down | In | In | In | Out | In | In | In | In | Feed ceases, amber light off. Gross and net counters held in. |
| 8 | At equilibrium with full gross weight. | Coincidence at gross weight. | Down | In | Out | In | Out | In | In | In | Out | Gross and net counters out. Printer operates. Green light on. |
| 9 | Full drum removed. | Out of coincidence | Up | In | In | In | Out | In | In | In | Out | Green light off. Pointer still held by magnetic clutch. |
| 10 | Clutched pointer falls back to 1 lb. mark. | do | Up | Out | In | In | Out | Out | In | In | Out | Pointer spring returned from 1 lb. mark to zero. |
| 11 | Platform at rest empty. | Coincidence at zero. | Up | Out | Out | Out | In | Out | Out | Out | In | Printer circuit not made at coincidence because 152 is open. White light on. |

If it is desired to use counting units which are operated by means of electrical impulses in the weighing apparatus illustrated in Figures 9, 10 and 11, the connection of N2 shown grounded is connected instead to the source of the electrical impulses.

Figure 12 illustrates a mechanism for indicating tare, gross and net weights on a panel and/or for printing these weights on, for example, labels for drums, invoices, sequence to the printing operation. Magnetic clutch 177 is required in this equipment if the counter wheels used cannot be rotated backwards after being reset to zero. Electrical or electronic counting means may be similarly operated and actuated by an impulsing mechanism, e.g. a commutator as hereinafter described, driven by said shaft. It is important where weights are recorded or indicated by a counting means that the mechanism which actuates the counter should be effectively damped to prevent movement of the actuating mechanism beyond the equilibrium position, since otherwise the counter will record or indicate weights which are higher than the true values.

Where it is desired to deliver a particular net weight and indicate only that weight, i.e. it is not necessary to indicate the tare and gross weights, the weighing machine illustrated in Figures 9, 10 and 11 may be modified as described hereinafter to achieve this result. This modification has the advantage that the desired net weight will always be determined irrespective of whether or not the platform is fully up when the weighing machine is in equilibrium in the unloaded position. That is to say, even if the platform is dirty during weighing, the desired net weight will be weighed out. The weighing machine is similar to that illustrated in Figures 9 and 10 but has only one counter which shows the net weight, and which is brought into operation when net weighing begins. The visual indicating scale which is remote from the weighing machine carries a pointer having attached to it a disc which is similar to the disc 137 as illustrated in Figure 10 being notched and being returned to zero by the action of a light spring carrying a roller. When the roller rides on the periphery of the disc the spring closes a contact, but the connection instead of being earthed as shown in Figure 10 is connected to a 24 volt direct current supply. The pointer brushes contacts on the indicating dial which control the change from coarse to fine feed and the stopping of the feed. In operation, a container is placed on the platform and when equilibrium is established the feed begins, and it stops when the pointer brushes the second contact. A printing unit may also be made to operate to record the net weight. On removing the filled container from the platform, the pointer returns to near the zero mark and the roller drops into the notch in the disc and breaks the magnetic clutch hold-on so that the pointer is then returned to zero against a fixed stop by the spring.

Figure 13:
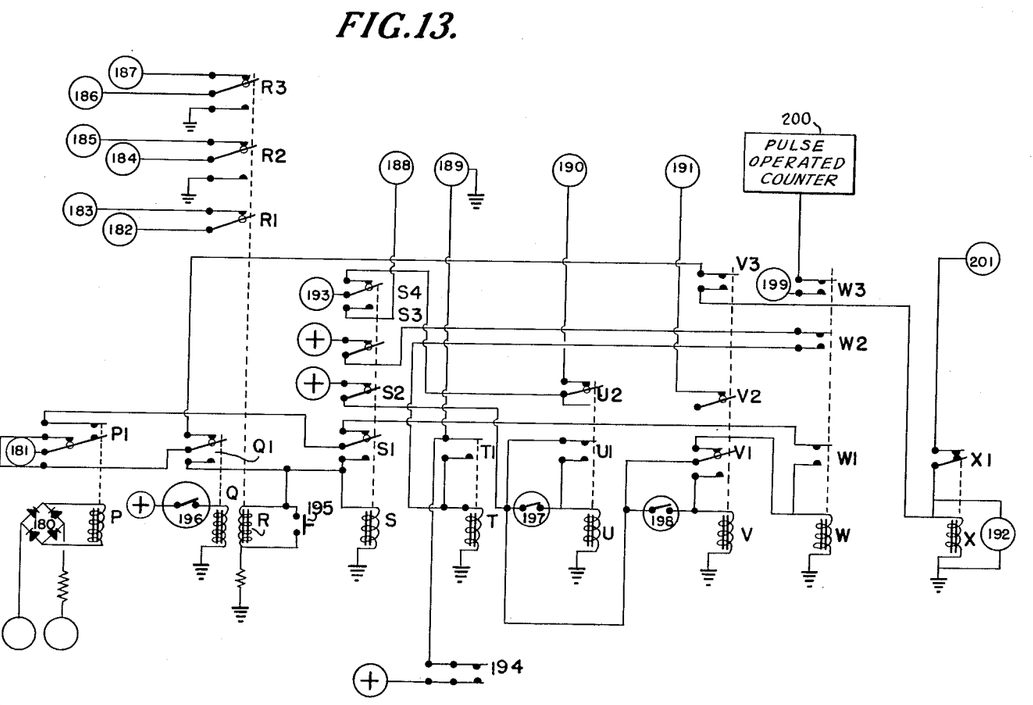
Figure 13 is a circuit diagram of means adapted for use with a modification of the weighing equipment of Figure 9.
Figure 18A:
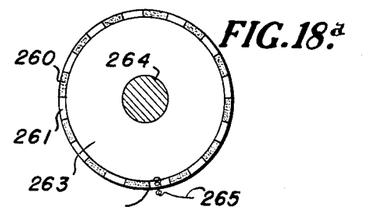
Figures 18a and 18b are elevational views of means for generating electric pulses by a magnetic tape and a conductor.
Figure 18B:
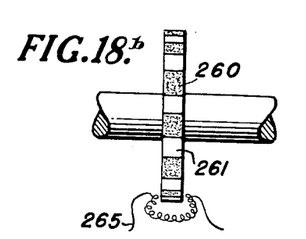
Figure 19A:
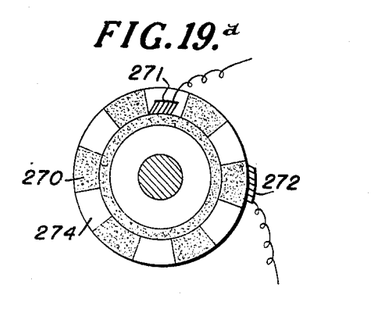
Figures 19a and 19b are elevational views of armature means for generating electric pulses.
Figure 19B:
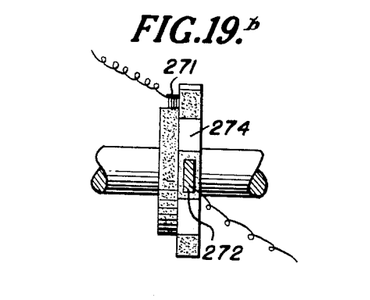
Figure 20A:
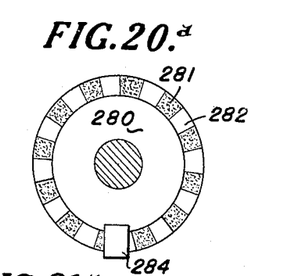
Figures 20a and 20b are elevational views of photoelectric means for generating electric pulses.
Figure 20B:
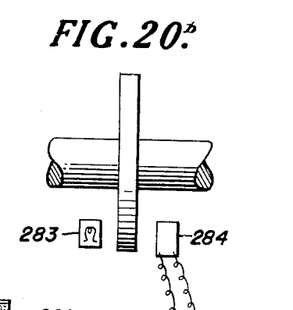
Figure 21A:
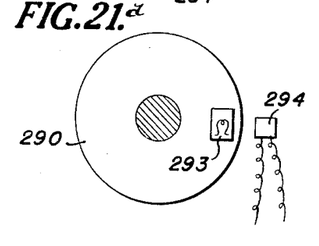
Figures 21a and 21b are elevational views of modified photoelectric means for generating electric pulses.
Figure 21B:
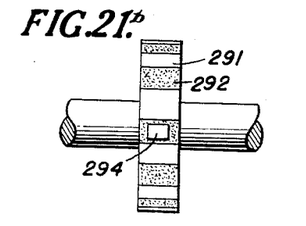

In this modification, instead of using a counter operated by a magnetic clutch, a scaling unit, i.e. a counter which is made to operate by electric impulses may be used. The impulses may be generated for example by the relative movements of a magnetic field and a conductor, e.g. a magnetic tape having alternate magnetised and unmagnetised parts may be made to move near a conductor, the movement of the magnetic tape mounted for example on the periphery of a disc, being controlled by the servo system so that the number of impulses generated by movement of the tape is a measure of the weight which causes the tape to move. In Figures 18a and 18b the magnetic tape having magnetised portions 260 and unmagnetised portions 261 is mounted on the disc 263 which is in turn mounted on the rotatable shaft 264, and the conductor 265 is positioned near the tape. The impulses may also be generated by a circuit which is opened and closed in a regular manner, e.g. as illustrated in Figures 19a and 19b by means of an armature, the current being fed to segments 270 on the armature by means of the brush 271 and the circuit being closed by a brush 272 which brushes the segments, and opened when the brush 272 contacts a non conducting portion 274 between the segments. The impulses may also be produced by the rotation of a disc whose angular rotation is proportioned to the weight on the platform as illustrated in Figures 20a and 20b, the disc 280 having around its edge alternate opaque and transparent areas 281 and 282 which intercept light passing from the source 283 into a photoelectric cell 284. Instead of a disc, a rotating hollow cylinder 290 (Figures 21a and 21b may be used, the cylinder having alternate transparent and opaque portions 291 and 292 circumferentially around its face and either the light source 293 or the photoelectric cell 294 being situated within the cylinder. As the disc moves the photoelectric cell gives rise to electric impulses which may be amplified and fed into a scaling unit. It is important where a counter is used which is made to operate by electric impulses, that the weighing machine is sufficiently damped to produce a dead beat response to avoid overshot. Such damping may be effected by known methods. Figure 13 illustrates the circuit by which this modification may operate.

In Figure 13, P, Q, R, S, T, U, V, W and X are relays operating the nine groups of contacts; P1; Q1; R1, R2, R3; S1, S2, S3, S4; T1; U1, U2; V1, V2, V3; W1, W2, W3; and X1, respectively. The contacts P1 are of the type which make before breaking the circuit. These relays are shown in the de-energized condition. Relay R and the press button manual switch 195 are only needed when it is intended to weigh material into a liner supported by a container, the neck of the liner first being attached to the delivery chute from the automatic feeder. The circuit is so arranged that when the platform is unloaded and the weighing machine mechanism returns to near its zero position relay R is energised and opens the servomotor circuit. The servomotor circuit is not brought in again until the switch 195 is closed. Switch 195 is of the press button type and returns to the open position when pressure is removed from it. In operating the weighing machine, after removal of a filled container, a fresh container is placed on the platform and the liner adjusted, switch 195 is pressed momentarily, and taring of the container and net weighing will then proceed automatically. If liners are not used, or if there is no need to adjust the liner while the container is on the platform, relay R is not needed and the servomotor circuit is kept closed throughout.

The rectifier 180 has its input terminals connected to the output terminals of the servomotor amplifier. 181 is a 110 volt supply of direct current. The contacts of relay R are connected as follows: 182 and 183 in series through a 50 volt alternating current supply to the input of the servomotor system so that R3 can open or close the servomotor input circuit 184 and 185 in series to the amplifier input and the output of the follower so that R2 can open or close the input circuit to the amplifier; and 186 and 187 in series to the amplifier input and the induction generator output. The terminal 193 is connected to a 230 volt supply of alternating current which can be fed through S4 to 188 which is a white lamp, or through U2 to the coarse feeder 190 which has a red lamp connected in parallel. The 230 volt supply can also be connected through V2 to the fine feed supply 191 which has an amber light connected in parallel. The contact 194 is the contact which is made by the spring operated roller which rides on the disc during net weighing and which when made provides a hold-on for the magnetic clutch 189 which operates the pointer. The magnetic clutch has a blue lamp connected in parallel. The switch 196 is operated by the servo mechanism and is closed when there is any weight of about 3 lbs. or less on the platform. This switch may be photoselectively operated, e.g. by a disc driven by the motor, the disc having a transparent sector which allows a beam of light to fall on a photoelectric cell which gives rise to a current which when amplified closes switch 196. The transparent sector and the movement of the disc are so arranged that the beam of light passes through the sector whenever a weight of 3 lbs. or less is upon the platform, and that the beam of light strikes the opaque part of the disc whenever there is a weight of more than 3 lbs. on the platform. It will be appreciated that this disc will always move an angular distance proportional to the effect of the weight on the platform when the servomotor circuit is closed. The trips 197 and 198 when made effect the changeover from coarse to fine feed and the stopping of the feed respectively. They are operated by the pointer (128 in Figure 9) brushing the contacts on the indicating dial (130 and 131 on Figure 9). Contact 199 is connected to the source of electric impulses, e.g. a rotating contactor or an amplifier which amplifies impulses from a photoelectric cell as hereinbefore described. The electric impulses are fed through W3, when closed, to a pulse operated counter 200, e.g. an electronic counter, or an electric binary counter, and contact 201 is connected to the printing unit. The printing unit is operated by a momentary current which is passed on at stage 7; no further current passes to the printer at this stage because contact X1 opens at the moment the printer operates. The relay X has a green lamp 192 connected in parallel. All the contacts marked + are connected to a positive 24 volt supply of direct current. It is to be understood that where the 230 volt alternating current supply is fed for example to the coarse feeder, there is an appropriate connection to neutral. The return of the scaling unit to zero is not shown in Figure 13 since this is a known feature of scaling unit printers, and forms no part of the present invention.

Table IV sets out the sequence of steps which take place during a weighing operation using a weighing machine controlled by the circuit illustrated in Figure 13. For purposes of simplification the working of relay R is not included in the table. The purpose of relay R is to keep the servomotor circuit open until the liner has been adjusted and the weighing machine is in equilibrium. During this stage the relays are as shown in stage 1 of Table IV, relay R also being in. When the liner has been adjusted, switch 195 is closed momentarily, relay R drops out, the servomotor circuit is closed and the relays are then as shown in stage 2 of Table IV. Relay R does not come in again until stage 11 of Table IV is reached.

may then be made to operate a relay. It may be desirable as the rate of feed of the impulses slows down as the weighing equipment nears equilibrium to ensure that the electronic means remains conducting, and this may be done by known methods, e.g. by the use of suitable condensers. Equilibrium may be detected magnetically by holding a magnet in a balanced position near a conducting part which is preferably non-magnetic, of the weighing equipment, so that as the part moves it causes a slight deflection of the magnet, and this deflection may be used to open or close an electric circuit. In a hydraulic method, a moving part of the weighing equipment may be made to exert a slight drag on a liquid from its normally stable position and in so doing to move a contact to make or break an electric circuit. In a pneumatic method, the expansion or compression of a gas by movement of the weighing equipment when it is not in equilibrium may be communicated to a member which moves accordingly and so causes a contact to move which opens or closes an electric circuit, the member moving back to its mean position when the weighing equipment is in equilibrium and the gas is at atmospheric pressure.

Figures 14, 15, 16 and 17 illustrate diagrammatically examples of such other methods which may be used to control mechanism for adjusting a weight determining means, or for bringing a weight determining means into operation.

Figure 14:
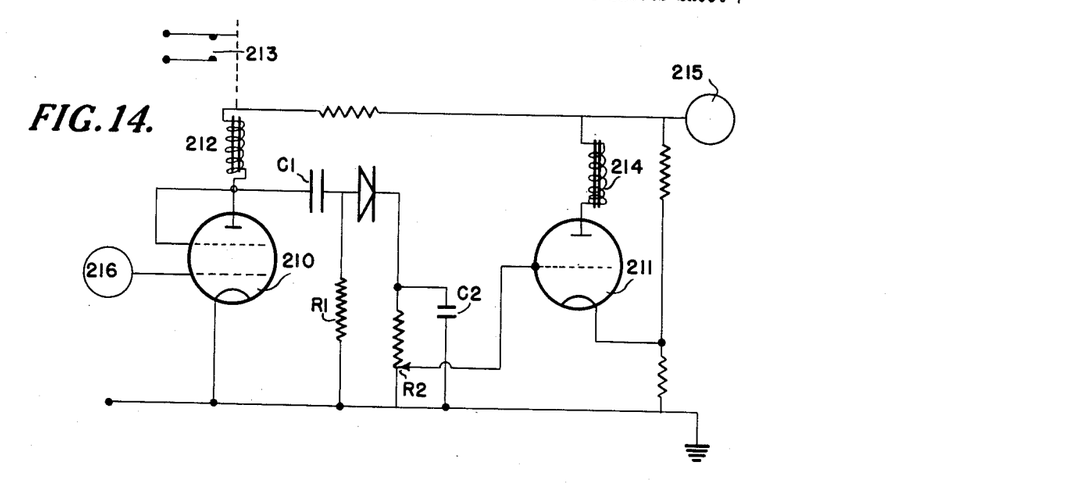
Figures 14, 15, 16 and 17 illustrate electronic, magnetic, hydraulic and pneumatic means, respectively, by which equilibrium may be automatically detected in weighing equipment.

Figure 14 illustrates a circuit for an electronic method of detecting equilibrium in the weighing equipment. The circuit is fed by electric impulses which may be generated as hereinbefore described and illustrated in Figures 18a, 18b, 19a, 19b, 20a, 20b, 21a and 21b, e.g. by an armature or by a photoelectric cell or by the movement of a magnetic tape. The circuit illustrated comprises valves, condensers, relays, resistances and a rectifier all represented conventionally. The valve 210 is a power or voltage amplifying valve, e.g. a valve of the type known as 6L6. The valve 211 is a voltage amplifier, e.g. a medium impedance triode valve of the type known as L63, or 6J5 or 6C5. The relay 212 is a high speed relay which operates the contacts 213 the upper contact being connected to a 110 volt supply of direct current and the

TABLE IV

Sequence of operations of weighing mechanism illustrated in Figure 13

| Stage No. | Weighing machine state | Servomotor System | Switches | | Relays | | | | | | | | Result |
| --- | --- | --- | --- | --- | --- | --- | --- | --- | --- | --- | --- | --- | --- |
| | | | 196 | 194 | P | Q | S | T | U | V | W | X | |
| 1 | Platform empty | Coincidence at zero. | Closed | Open | Out | In | In | Out | Out | Out | Out | Out | White lamp on. No feed. |
| 2 | Drum on platform. | Out of coincidence. Follower past 3 lb. mark. | Open | do | In | Out | In | Out | Out | Out | Out | Out | S remains in because P1 is a make-before break. |
| 3 | do | Coincidence at tare. | do | do | Out | Out | Out | In | Out | Out | In | Out | Coarse feed starts. Red lamp on. Magnetic clutch in. Impulses fed to scaling unit. |
| 4 | Pointer passes 1 lb. mark. | Out of coincidence. | do | Closed | In | Out | Out | In | Out | Out | In | Out | Magnetic clutch now held in by 194. |
| 5 | Coarse feed trip reached. | do | do | do | In | Out | Out | In | In | Out | In | Out | Coarse feed changes to fine. Amber lamp on. |
| 6 | Fine feed trip reached. | do | do | do | In | Out | Out | In | In | In | In | Out | Feed ceases, amber lamp off. Impulses still passed to scaling unit. |
| 7 | All material fed to drum. | Coincidence at gross. | do | do | Out | Out | Out | In | In | In | Out | In | Impulses to scaling unit cut off. Impulse given to printer. Green light on. |
| 8 | Full drum removed. | Out of coincidence. | do | do | In | Out | Out | In | In | In | Out | Out | Green light off. Pointer still clutched. |
| 9 | Clutched pointer falls back to 1 lb. mark. | do | do | Open | In | Out | Out | In | In | In | Out | Out | Pointer spring returned to zero. |
| 10 | Follower reaches 3 lb. mark. | do | Closed | do | In | In | Out | Out | In | In | Out | Out | Printer circuit opened. |
| 11 | Platform at rest empty. | Coincidence at or near zero. | do | do | Out | In | In | Out | Out | Out | Out | Out | White light on. Printer circuit still open. |

Other methods by which equilibrium may be detected in the weighing equipment include electronic, magnetic, hydraulic and pneumatic methods as described hereinafter and illustrated in Figures 14, 15, 16 and 17. In an electronic method there may be an electronic means which may be made conducting when electric impulses are fed into the detecting means and this electronic means lower contact being connected to the scaling unit through appropriate contacts. The source of current 215 is a positive high tension direct current supply and the voltage will depend upon the valves used, e.g. with a valve of the type known as 6L6 at 210 the high tension supply would be 400 volts. The electric impulses from the weighing machine are fed in at 216. The valve 210 amplifies these impulses and passes them on to the high speed relay 212 which by making and breaking the contacts 213, makes electric impulses available to the scaling unit. While valve 210 passes on impulses the valve 211 conducts and energises the relay 214. When valve 210 stops passing on impulses, i.e. when the weighing machine is in equilibrium the valve 211 ceases to conduct and relay 214 is de-energised. Depending upon the capacities of the condensers and the values of the resistances R1 and R2, the valve 211 can be made to stop conducting immediately or only after an interval of time, e.g. up to several seconds. We have found, for example, that when using valves of the type known as 6L6 and L63, or 6J5 or 6C5, a delay of from 1 to 2 seconds before valve 211 ceases to conduct may be obtained when the condensers C1 and C2 have capacities 0.05 and 1.0 microfarads respectively, and the resistances R1 and R2 are 680,000 ohms and 2 megohms respectively. Such a delay may be desirable where it is important that all the impulses should be counted before the relay 214 is de-energised. If a steady current flows into valve 210, this may happen for example if the impulses are provided by a rotating disc interrupting light to a photoelectric cell and at equilibrium the disc should come to rest with a transparent portion between the beam of light and the photoelectric cell, relay 211 will still drop out since there is no transfer of charge across the condenser unless there is a changing potential.

The circuit illustrated in Figure 14 may be used for example in combination with that illustrated in Figure 13 by replacing relay P (Figure 13) by relay 214 (Figure 14), and by connecting the lower contact of 213 (Figure 14) to the lower contact of W3 (Figure 13). The rest of the circuit of Figure 13 remains the same.

Figures 15, 16:
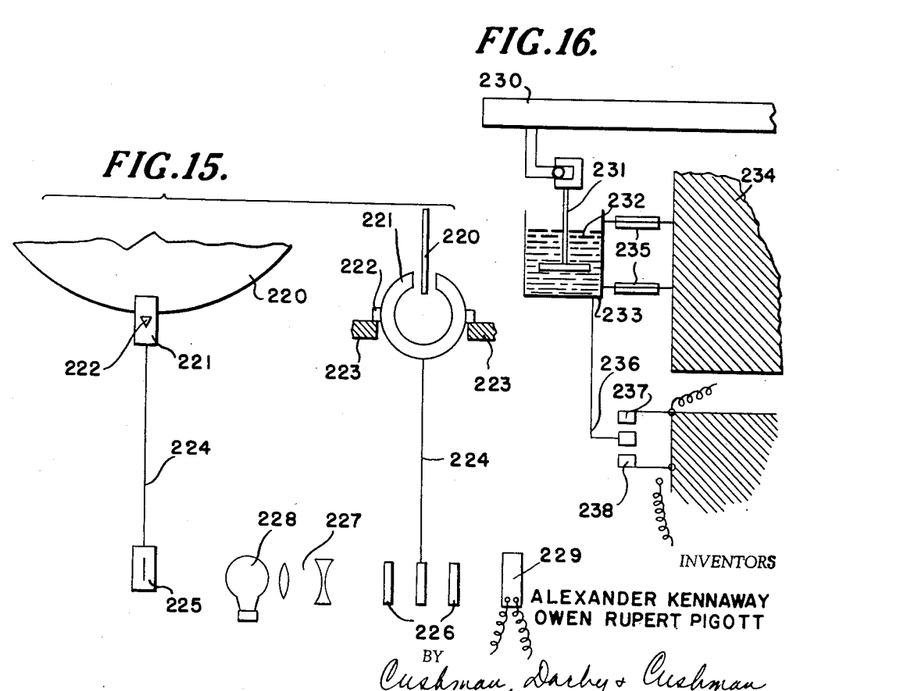

Figure 15 illustrates a method of detecting equilibrium using a magnet. In the diagram which shows a front and a side elevation of the arrangement, 220 represents part of a disc which rotates when the weighing machine is not in equilibrium. Below the lower edge of the disc is a magnet 221 supported by knife edges 222 resting on the supports 223, the knife edges being above the centre of gravity of the magnet. The shape and position of the magnet are such that the edge of the disc passes midway between the poles of the magnet. The magnet has attached to it a thin wire 224 which carries a mask 225 which has a slit in it. The mask 225 may be made of any lightweight, opaque, rigid material, e.g. metal foil. In the equilibrium position the mask 225 is arranged to lie between two other masks 226 which also have slits, so that a beam of light from the source 228 passes through the collimating system 227 through the slits on to the photoelectric cell 229. The disc 220 is preferably made from a non ferrous metal, e.g. aluminium, to eliminate any attraction of the disc to either pole of the magnet. When the disc rotates it will cause the magnet to move slightly in the direction of rotation; the magnet will therefore swing slightly on its knife edge and the slit 225 will move out of alignment with the slits in the masks 226. The photoelectric cell 229 will then cease to give a current. Therefore when the weighing machine is not in equilibrium the photoelectric cell does not give a current, and when the weighing machine is in equilibrium the photoelectric cell gives a current. This current when amplified can be made to operate relays which control mechanism for adjusting the weight determining means, or for bringing the weight determining means into operation. For example, this method may be used to control relay H of Figure 11 instead of using the output from the servomotor system.

Since equilibrium corresponds to a flow of current from the photoelectric cell it is necessary in this case to modify the contacts H1 and H2 so that H1 is closed, and H2 open when H is de-energised. Before the disc comes to rest at equilibrium it might oscillate to a certain extent about the equilibrium position, depending upon the speed with which it approaches that position, e.g. when operating a fine feed the disc will normally come to a stop without oscillating. However, if as the magnet returns to its equilibrium position it oscillates, it will cause the photoelectric cell to pass on an interrupted current before the current becomes steady. This may be prevented from having any disadvantageous effect by incorporating in the circuit a time delay of known kind, e.g. a condenser across the relay coil which delays the build up of voltage across the relay coil, so that the photoelectric cell must be illuminated for a definite time before the relay operates.

Figure 16 illustrates a hydraulic method by which equilibrium in the weighing equipment may be detected. In the diagram, 230 is the tare beam of a weighing machine having a piston 231 suspended from it so that as the tare beam moves up or down the piston follows its movement. The end of the piston is beneath the level of the liquid 232 in the container 233. The container is attached to a support 234 by latch spring hinges 235. At the bottom of container 233 there is connected the contact 236. On either side of contact 236 are two other contacts 237 and 238. When the tare beam moves up the container tends to be carried up by the piston, and while the tare beam is moving up the contact 236 touches contact 237 thus causing current to flow through an appropriate circuit. Similarly, when the tare beam is moving down contact 236 touches contact 238 and closes a circuit which may be the same as or different to the circuit closed by contacts 236 and 237. When the tare beam comes to rest at equilibrium the flow of liquid in the container allows the container to return to its normal position with contact 236 not touching either 237 or 238. Therefore, when the tare beam moves, current flows, when the tare beam is at rest no current flows. The circuit may be modified by the incorporaton of one or more condensers to ensure that either no current flows or that only a steady current flows, so that when the tare beam comes to rest or starts to move the consequence is that either a steady current ceases to flow or that a steady current starts to flow.

Figure 17:
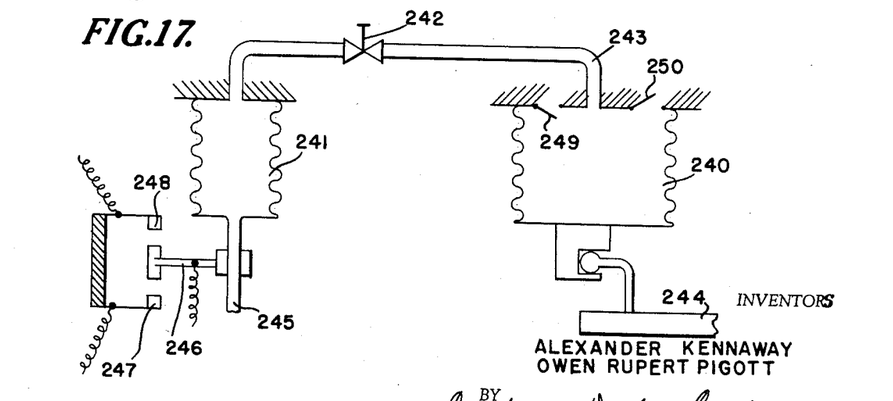

Figure 17 illustrates a method by which equilibrium in the weighing equipment may be detected by a pneumatic method. In the diagram, 240 is a rateless bellows, i.e. a bellows which has no stiffness, e.g. a bellows made of fabric or limp film material. The bellows 241 is a medium rated bellows, i.e. a bellows which may be compressed or expanded but when the pressure is released tends to return to a particular position. Such a bellows may be made of metal. The bellows 240 is attached to the tare beam 244 of a weighing machine and it is connected by means of a tube 243 to the bellows 241. The tube has a valve 242 which restricts the passage of air from one bellows to the other to any desired extent. Bellows 240 is provided with valves 249 and 250 which allow air to be rapidly drawn in from or allowed to escape to the atmosphere so that the movement of the tare beam is not hindered by the compression or expansion of bellows 240. Bellows 241 has a nozzle 245 which is open to the atmosphere and also carries a contact 246 which lies between two other contacts 247 and 248. When the tare beam moves up the bellows 240 is compressed and some of the compressed air passes into the bellows 241 causing it to expand. The nozzle 245 moves downward and contact 246 touches contact 247. When the tare beam moves down air is drawn from bellows 241 into bellows 240. When the tare beam comes to rest the bellows 241 tends to return to its mean position and to allow this, air is either drawn into or escapes from the nozzle, depending upon whether bellows 241 is expanded or compressed. Thus, when the tare beam is at rest and the bellows 241 has returned to its mean position the contact 246 is separated from either contacts 247 and 248. By adjusting the valve 242 and the size of the nozzle 245, the bellows 241 may be allowed to return to its mean position only after a certain time after the tare beam has come to rest, and thus allow the contacts to be broken only after the weighing machine is in static equilibrium. The contacts may form part of a circuit which controls further operation of the weighing machine, and use may be made of this method to distinguish between equilibrium in the weighing machine after being loaded, and equilibrium after being unloaded.

As stated, our invention may be used for measuring out material in amounts by weight into containers as well as for measuring the weight of material that has been inserted into containers while they are standing on a weighing machine platform. For the former, a means for supplying material to the container may be initiated by the mechanism which detects equilibrium between the weight of the container and movement of the weighing equipment. This means may be stopped by any of the following methods:

(1) *Wiping contacts.*—When pointer 22 of the weighing equipment illustrated in Figure 2 makes a wiping contact with contact 24 an electric current may be initiated to stop the flow of material into the container. It is preferred in such a system that there should be two contacts 24 and 24a, contact of the pointer with contact 24a actuating a current to slow down the flow of material into the container and contact with contact 24 being to stop this flow. It will be appreciated that a similar system for stopping this flow may be achieved in a weight indicating equipment, as illustrated in Figure 1, by one or two similar wiping contacts 14 placed on the moving scale 13. Again, this system may be operated on the remote control scale illustrated in Figures 7 and 8 by providing a moving scale which ceases to move when equilibrium is established with the empty container on the platform. The moving contact carries a contact 105 which is wiped by the pointer during net weighing and stops the flow of material into the container. An advantage of remote control equipment when our invention is used for measuring out amounts by weight of material which is inserted into containers, is that the equipment for adjusting this amount is removed from that part of the equipment in which the weight of the added material is counter balanced by counteracting forces and the delicate mechanism which achieves this counter balancing is not disturbed by being required to perform other mechanical operations.

(2) *Counters.*—A mechanical counter may be used for determining the amount by weight of material that is inserted into containers. It may be adjusted to stop, or first slow down and then stop, the flow of material into a container when it has been operated to count a net weight which is required. Mechanical counters may be used for this purpose by arranging that when the desired weight is shown an electric circuit formed by contacts on the discs which carry the digits is closed which slows down the rate of feed and when the desired net weight is shown another circuit is closed which stops the feed. It may be necessary to arrange to stop the feed slightly before the desired net weight is shown to make allowance for airborne material. Experience will show at what net weight the feeder should be stopped to make sure the desired net weight is fed.

(3) *Photoelectric.*—Photoelectric methods may be used to stop flow of material from an automatic feeder by, for example, making needle 11 in Figure 1, pass over a photoelectric cell so placed that interruption of light to the cell or passage of light to the cell operates a circuit which causes the feed to stop or slow down, and then stop.

When our invention is used for determining amounts of powders, granules, pellets, lumps or chippings fed automatically into containers, we prefer that they are fed by a hydraulic vibratory feeder, because this type of feeder has a sharp cut-off, is relatively quiet in operation, can operate at variable amplitudes and frequencies and can be used to feed widely differing sizes of solid materials. Such feeding mechanisms are well known, and therefore not specifically illustrated herein.

When our invention is used for filling containers from bunkers or hoppers with an automatic outlet feed and the containers have liners, we prefer that there should be a switch for starting or stopping the automatic operation of our equipment in order that the liner may be adjusted to the feeding device without the weighing mechanism being upset. Such a switch is described hereinbefore in connection with the weighing equipment illustrated in Figures 9, 10 and 11. Thus, there may be a switch which is operated when the liner has been suitably arranged, and causes the sequence of weighing equipment adjustment for the weight of the container, starting and stopping the feed of the material, together with if desired, tare, net and gross weighing, and followed, if desired, by the removal of the filled container from the platform and its labelling, and the placing of a new container on the platform. The switch may be automatically controlled so that at any suitable stage of the weighing sequence the switch is operated to open the circuit which controls the automatic operation of the equipment and the circuit is only closed by manual operation of the switch. Alternatively, the weighing equipment may be so adjusted that the net weight determining means (already set automatically ready for operation) and, if desired, the flow of the material into the container, are not set into operation until a switch has been operated which would not be done until the liner has been adjusted. Yet another method of operating is for the weighing equipment adjustment mechanism to be switched out of operation or for the net weight recording or indicating mechanism to be switched into operation as the case may be (depending, e.g. upon whether equipment as illustrated in Figure 1 or 2 respectively is used) when the liner has been suitably arranged, flow of material to the container being started at the same time if desired. Of these various methods of operation, we prefer the first because minor movements of the weighing equipment are thereby avoided and wear is minimised and human errors most certainly avoided.

We claim:

1. Automatic weighing mechanism comprising in combination an article carrying member operable in response to change of load carried thereby, a weight measuring means operatively connected with said article carrying member and operable from a zero position to measure increase of load carried by said member, means operatively connected with said member for detecting cessation of operation of said member following a change of load carried by said member, means to render said weight measuring means inoperable at zero during said change, and means operatively connected with said weight measuring means and operable in response to a detection of cessation by said detecting means for rendering said weight measuring means operable from zero position to measure the extent of further operation of said member as a result of increase of load carried by said member after said cessation.

2. Automatic weighing mechanism as defined in claim 1, wherein said weight measuring means includes an element rendered inactive upon said detection of cessation to additional load placed upon said member, to indicate tare weight.

3. Automatic weighing mechanism as defined in claim 1, wherein said weight measuring means includes an electronic counter and means operative upon said detection of cessation to feed impulses to said counter in accordance with subsequent increase of weight carried by said member.

4. Automatic weighing mechanism as defined in claim 1, wherein said means for detecting cessation of operation of said member comprises a servo motor circuit and a relay operative when current ceases to flow in said circuit.

5. Automatic weighing mechanism as defined in claim 1, wherein said means for detecting cessation of operation of said member comprises a Wheatstone bridge system, means for varying a component in said bridge in accordance with change of weight carried by said member, means for varying another component in said bridge by a motor energized by out-of-balance current in the system, and a relay operative when current ceases to flow in the system.

6. Automatic weighing mechanism as defined in claim 1, wherein said means for detecting cessation of operation of said member comprises means for generating electric pulses in accordance with movement of said article carrying member, means responsive to said pulses for flowing a current through an electronic conductor, and a relay operative when current ceases to flow through said electronic conductor.

7. Automatic weighing mechanism as defined in claim 1, wherein said means for detecting cessation of operation of said member comprises an element having alternate transparent and opaque portions movable in accordance with movement of said article carrying member, a source of light directed toward said element, a photo sensitive device mounted to receive light projected by said source through the transparent portions of said element and thereby generate electric pulses, means responsive to said pulses for flowing a current through an electronic conductor, and a relay operative when current ceases to flow through said electronic conductor.

8. Automatic weighing mechanism as defined in claim 1, wherein said means for detecting cessation of operation of said member comprises a conductor and a source of lines of varying magnetic force movable relative to each other in accordance with movement of said article carrying member to generate electric pulses, means responsive to said pulses for flowing a current through an electronic conductor, and a relay operative when current ceases to flow through said electronic conductor.

9. Automatic weighing mechanism as defined in claim 1, wherein said means for detecting cessation of operation of said member comprises a metallic part movable in accordance with movement of said article carrying member, a magnet normally balanced adjacent said metallic part in such manner as to be temporarily unbalanced by relative movement of said metallic part, and means for affecting an electrical circuit when said magnet is balanced.

10. Automatic weighing mechanism as defined in claim 1, wherein said means for detecting cessation of operation of said member comprises a non-ferrous metallic disc movable in accordance with movement of said article carrying member, a magnet normally balanced adjacent said disc in such manner as to be temporarily unbalanced by relative movement of said disc, and means for affecting an electrical circuit when said magnet is balanced.

11. Automatic weighing mechanism as defined in claim 1, wherein said means for detecting cessation of operation of said member comprises a plunger and a liquid-containing container, said plunger extending into the liquid in said container, one of said liquid connected elements being movable in accordance with movement of said article carrying member and the other of said liquid connected elements being normally balanced in such manner as to be unbalanced by relative movement of the movable element, and means for affecting an electrical circuit when said normally balanced element is balanced.

12. Automatic weighing mechanism as defined in claim 1, wherein said means for detecting cessation of operation of said member comprises a bellows and means for varying the internal pressure of said bellows in accordance with movement of said article carrying member, and means for affecting an electrical circuit when said bellows is in normal equilibrium position.

13. Automatic weighing mechanism as defined in claim 1, wherein said weight measuring means is remote from said article carrying member and linked thereto by a servo motor circuit.

14. Automatic weighing mechanism as defined in claim 1, wherein said weight measuring means is remote from said article carrying member and linked thereto by a Wheatstone bridge system.

15. Automatic weighing mechanism as defined in claim 1, including means operatively connected with said means for detecting cessation and operative upon said detection to initiate flow of material onto said article carrying member.

16. Automatic weighing mechanism for determining net weights comprising in combination an article carrying member operable in response to change of load carried thereby, a weight measuring means operatively connected with said article carrying member and operable from a zero position to measure increase of load carried by said member, means operatively connected with said member for detecting cessation of operation of said member following an increase of load carried by said member, means to render said weight measuring means inoperable at zero during said increase, and means operatively connected with said weight measuring means and operable in response to a detection of cessation by said detecting means for rendering said weight measuring means operable from zero position to measure the extent of further operation of said member as a result of further increase of load carried by said member after said cessation.

17. Automatic weighing mechanism as defined in claim 16, including means operatively connected with said weight measuring means and operative to re-adjust the weight measuring means to zero position when load is removed from said article carrying member.

18. Automatic weighing mechanism for determining gross weights comprising in combination an article carrying member operable in response to change of load carried thereby, a weight measuring means operatively connected with said article carrying member and operable from a zero position to measure increase of load carried by said member, means to render said weight measuring means inoperable at zero during a decrease of load carried by said member, means operatively connected with said member for detecting cessation of operation of said member following a decrease of load carried by said member, and means operatively connected with said weight measuring means and operable in response to a detection of cessation by said detecting means for rendering said weight measuring means operable from zero position to measure the extent of further operation of said member as a result of increase of load carried by said member after said cessation.

References Cited in the file of this patent

UNITED STATES PATENTS

| | | |
|---|---|---|
| 1,402,934 | Hoopner | Jan. 10, 1922 |
| 1,629,221 | MacNutt | May 17, 1927 |
| 1,923,745 | Platzer | Aug. 22, 1933 |
| 2,022,659 | Fisher | Dec. 3, 1935 |
| 2,067,743 | Weckerly | Jan. 12, 1937 |
| 2,085,345 | Tuttle et al. | June 29, 1937 |
| 2,131,683 | Basquin | Sept. 27, 1938 |
| 2,132,237 | Haegele | Oct. 4, 1938 |
| 2,167,517 | Korber | July 25, 1939 |
| 2,169,465 | Hadley | Aug. 15, 1939 |
| 2,323,023 | Flanagan | June 29, 1943 |
| 2,336,130 | Saxe | Dec. 7, 1943 |

(Other references on following page)

UNITED STATES PATENTS

| | | |
|---|---|---|
| 2,343,000 | Carliss | Feb. 28, 1944 |
| 2,394,593 | Christmann | Feb. 12, 1946 |
| 2,407,513 | Pounds | Sept. 10, 1946 |
| 2,516,456 | Fischer | July 25, 1950 |
| 2,577,820 | Singleton | Dec. 11, 1951 |
| 2,614,786 | Caron | Oct. 21, 1952 |
| 2,678,206 | Muldoon et al. | May 11, 1954 |
| 2,680,012 | Bozoian | June 1, 1954 |
| 2,803,448 | Biebel | Aug. 20, 1957 |
| 2,819,054 | Thorsson | Jan. 7, 1958 |
| 2,851,262 | Hoffmanns | Sept. 9, 1958 |